Figure 1:
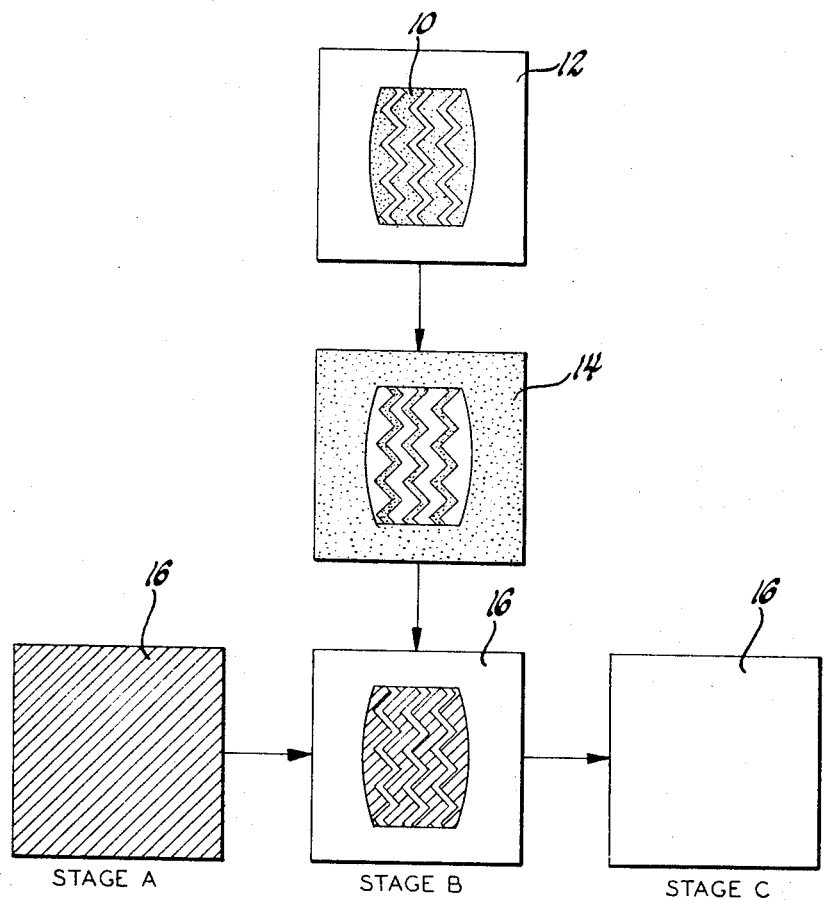

United States Patent [19]
Bolhuis

[11] 3,755,659
[45] Aug. 28, 1973

[54] METHOD OF DETERMINING THE SURFACE AREA OF AN IRREGULAR SHAPE

[75] Inventor: John R. Bolhuis, Utica, Mich.

[73] Assignee: General Motors Corporation, Detroit, Mich.

[22] Filed: June 15, 1972

[21] Appl. No.: 263,218

[52] U.S. Cl.................... 235/151.3, 73/146, 156/2, 235/195
[51] Int. Cl...... B44c 1/22, G01m 17/02, G06g 7/16
[58] Field of Search............ 235/193, 151.3, 151.33, 235/151, 151.1, 194, 195, 196; 73/146; 96/32, 36, 36.2, 36.3, 38.4; 156/2, 5, 7, 8, 12, 16, 18, 345

[56] References Cited
UNITED STATES PATENTS
3,233,509  2/1966  Swiggett.......................... 96/36 UX
3,398,397  8/1968  O'Connell....................... 73/146 X
3,415,648  12/1968  Certa................................. 96/36
3,492,863  2/1970  Vance............................. 73/146 X Primary Examiner—Joseph F. Ruggiero
Attorney—C. R. Meland, Howard N. Conkey et al.

[57] ABSTRACT

The method of measuring the area of a tire print including the steps of making a photographic negative of the tire print, weighing a circuit board having a full copper layer, etching away by a photoetching process the copper on the circuit board except for copper within the boundaries defined by the surface area to be measured to produce a copper pattern having an area equal to the area of the tire print, reweighing the circuit board, removing the remaining copper on the circuit board, reweighing the circuit board with all the copper removed, and multiplying the ratio of the weight of the copper pattern to the total weight of the copper removed times the total area of the printed circuit board.

2 Claims, 2 Drawing Figures

PATENTED AUG28 1973 3,755,659

3,755,659

METHOD OF DETERMINING THE SURFACE AREA OF AN IRREGULAR SHAPE

This invention relates to a method for determining the area of complex surfaces lying within a plane and, more specifically, a method of determining the area of a tire print.

Known apparatus for determining the area of a tire print includes mechanical devices which integrate the area of the tire print when its outline is physically traced and known methods for determining such areas include the method of making a print of the tire on a member having a known area per weight ratio, cutting the complex surface area within the tire print from the member, weighing the resulting pattern and multiplying the weight times the known area per weight ratio to determine the area of the tire print. The foregoing apparatus and method are at a disadvantage as the boundaries of a tire print are very irregular and consequently difficult to trace or cut along. It is the general object of this invention to provide an improved method for determining the area of an irregular planar surface.

It is another object of this invention to provide a method of determining the area of an irregular planar surface having increased accuracy.

It is another object of this invention to provide a method of determining the area of a tire print surface with an accuracy and ease of determination which are unaffected by the complexity of the tire print.

Figure 2:
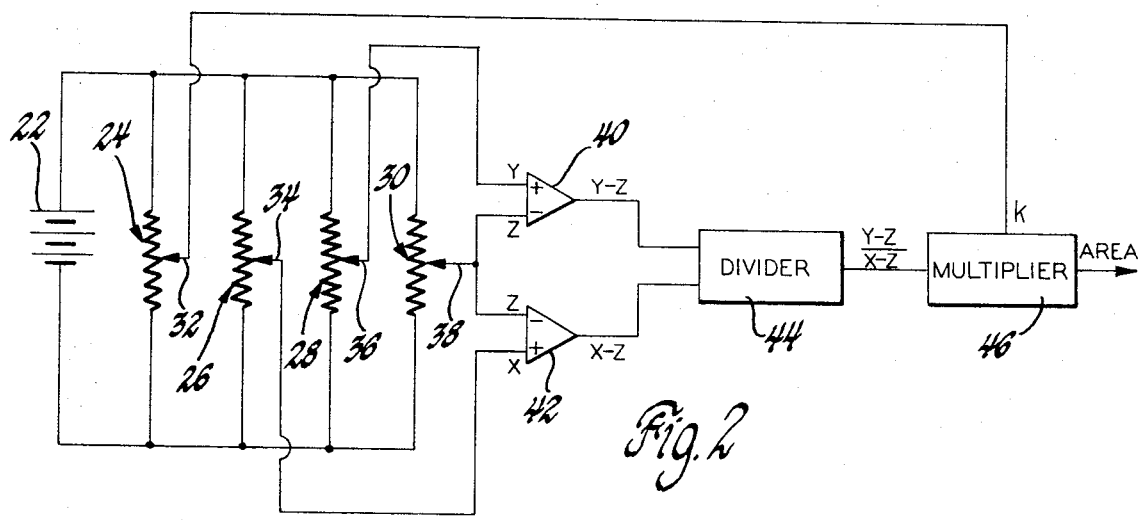

These and other objects of this invention will be best understood by reference to the following description of a preferred embodiment and the drawings in which:

FIG. 1 is a flow diagram illustrating the method of this invention for determining the area of a tire print, and FIG. 2 is a schematic drawing of a circuit for performing the required mathematical functions and for providing an output representing the area of the tire print.

Referring to FIG. 1, an image 10 of a tire print, the area of which is to be measured, is made on a surface 12. The image 10 could be made, for example, by depositing ink on the surface of a tire and pressing the tire on the surface 12. A photographic negative 14 is then made in the conventional manner of the image 10.

A circuit board 16 having a known area is shown in FIG. 1 in three etching stages in the method for determining the area of the image 10, the stages being identified as A, B and C respectively. For purposes of illustration, it will be assumed that the circuit board 16 has a substrate comprised of glass filled epoxy upon which a layer of copper is plated or glued over the entire surface thereof. It will be understood that the circuit board 16 may be comprised of other materials such as, for example, a Mylar, Teflon, or vinyl substrate upon which a conductive layer of nickel or aluminum may be glued or plated. Circuit boards of this nature are well known and will not be described in further detail.

The circuit board 16 having the copper layer over the entire surface thereof is weighted at stage A prior to any etching operation thereon. For purposes of illustration, it will be assumed that the magnitude of this weight is equal to X. Then, all the copper on the circuit board 16 is removed as shown at stage B by a photoetching process except for the copper within the boundaries of the complex surface as determined by the photographic negative 14. As can be seen in FIG. 1, the copper on the circuit board at stage B forms a pattern identical to the image 10. As is well known, the photoetching process consists of the depositing of a photoresist over the copper of the circuit board 16, the photoresist having the property of being sensitive to light in that it is rendered insoluble to a developing solution, such as water, after having been exposed to light. The photoresist is then exposed to light through the photographic negative 14 with the portion exposed to light through the photographic negative 14 being rendered insoluble to the developing solution. The portion of the photoresist not exposed to light is then dissolved or washed away by the developing solution. The circuit board 16 is then placed in an etching chemical, such as ferric chloride which dissolves the copper layer on the substrate where the photoresist was washed away by the developing solution. The surface area of the copper remaining on the circuit board 16 is an exact duplicate of the tire print as defined by the photographic negative 14.

The circuit board 16 is then weighed at stage B. It will be assumed for purposes of illustration that the magnitude of this weight is equal to Y. The photoresist remaining on the surface of the copper on the circuit board 16 is removed and the remaining copper is etched away leaving only the substrate portion of the circuit board 16 as shown at stage C. The circuit board 16 is then weighed with the magnitude of the weight being, for purposes of illustration, equal to Z.

The weight of the copper pattern on the circuit board 16 at stage B is determined by subtracting the weight Z at stage C from the weight B at stage B. The total weight of the copper layer on the circuit board 16 at stage A is determined by subtracting the weight Z at stage C from the weight X at stage A. The area of the image 10 is then determined by multiplying the ratio of the weight of the copper pattern on the circuit board 16 at stage B to the total weight of the copper layer on the circuit board at stage A times the area of the circuit board 16. In this manner, the area of the tire print is determined.

Referring to FIG. 2, there is shown a circuit for performing the mathematical steps to provide an indication of the area of the image 10. A DC voltage supply 22 applies power across a plurality of potentiometer assemblies 24, 26, 28 and 30 having wiper arms 32, 34, 36 and 38, respectively.

The wiper arm 38 of the potentiometer assembly 30 is connected to the negative input of a differential amplifier 40 and the negative input of a differential amplifier 42. The wiper arm 36 of the potentiometer assembly 28 is connected to the positive input of the differential amplifier 40 and the wiper arm 34 of the potentiometer assembly 26 is connected to the positive input of the differential amplifier 42.

The wiper arm 38 is manually positioned so as to supply a voltage to the negative inputs of the differential amplifiers 40 and 42 having a magnitude representing the weight Z of the circuit board 16 with all of the copper removed at stage C. The wiper arm 36 is positioned so as to supply a voltage to the positive input of the differential amplifier 40 having a magnitude representing the weight Y of the circuit board 16 at stage B. The wiper arm 34 is positioned so as to supply a voltage to the positive input of the differential amplifier 42 having a magnitude representing the weight X of the circuit board with all of the copper on the surface thereof as at stage A. The output of the differential amplifier 40 is a signal representing the quantity Y–Z which equals the weight of the copper pattern on the circuit board 16 at stage B and the output of the differential amplifier 42 is a signal representing the quantity X–Z which equals the total weight of the copper on the circuit board 16 at stage A. The outputs of the differential amplifiers 40 and 42 are supplied to a divider 44 which divides the quantity Y–Z by the quantity X–Z and supplies a signal representing the quotient to a multiplier 46.

The wiper arm 32 of the potentiometer assembly 24 is positioned so as to supply a signal to the multiplier 46 having a magnitude $k$ representing the area of the circuit board 16. The output of the multiplier is a signal equal to the product $(Y-Z/X-Z)\ k$ which is a direct representation of the area of the image 10.

The divider 44 and the multiplier 46 are standard items for providing the functions represented thereby and consequently are not shown in greater detail.

Although the invention as illustrated by the foregoing description of a preferred embodiment uses a photographic negative, it will be understood by one skilled in the art that a photographic positive transparency or other light shield could also be used, it being understood that to determine the weight of the copper removed from within the boundaries of the image 10 as defined by the transparency, it would be necessary to subtract the weight of the circuit board 16 at stage B from the weight at stage A. In addition, a circuit board and photoetching process need not be used. Any member and means for removing material from its surface at a uniform depth could be used.

The detailed description of the preferred embodiment of the invention for the purpose of explaining the principles thereof is not to be considered as limiting or restricting the invention, since many modifications may be made by the exercise of skill in the art without departing from the scope of the invention.

I claim:

1. The method of determining the area of an irregular shape comprising the steps of weighing a circuit board having a substrate carrying a conductive layer having a known area; making a photographic negative of the irregular shape; photoetching the conductive layer from the substrate external of the boundaries of the irregular shape as determined by the photographic negative to form a conductive layer pattern having an area equal to the area of the irregular shape; reweighing the circuit board; removing the remaining portion of the conductive layer from the substrate; and weighing the substrate, whereby subtraction of the weight of the substrate from the weight of the circuit board with the conductive layer photoetched from the substrate external from the boundaries of the irregular shape gives the weight of the conductive layer pattern, the subtraction of the weight of the substrate from the weight of the circuit board prior to the photoetching of the conductive layer gives the total weight of the conductive layer and the product of the ratio of the weight of the conductive layer pattern to the total weight of the conductive layer and the area of the conductive layer gives the area of the irregular shape.

2. The method of determining the area of a tire print comprising the steps of weighing a circuit board having a substrate carrying a conductive layer having a known area; making an image of the tire print; making a photographic negative of the image of the tire print; photoetching the conductive layer from the substrate external of the boundaries of the image of the tire print as determined by the photographic negative to form a conductive layer pattern having an area equal to the area of the image of the tire print; reweighing the circuit board; removing the remaining portion of the conductive layer from the substrate; and weighing the substrate, whereby subtraction of the weight of the substrate from the weight of the circuit board with the conductive layer photoetched from the substrate external from the boundaries of the image of the tire print gives the weight of the conductive layer pattern, the subtration of the weight of the substrate from the weight of the circuit board prior to the photoetching of the conductive layer gives the total weight of the conductive layer and the product of the ratio of the weight of the conductive layer pattern to the total weight of the conductive layer and the area of the conductive layer gives the area of the tire print.

* * * * *